United States Patent
Swain et al.

(10) Patent No.: US 12,461,230 B2
(45) Date of Patent: Nov. 4, 2025

(54) METHOD AND SYSTEM FOR SURFACE WEAR INSPECTION USING MILLIMETER WAVE RADAR

(71) Applicant: Tata Consultancy Services Limited, Mumbai (IN)

(72) Inventors: Amit Swain, Kolkata (IN); Anwesha Khasnobish, Kolkata (IN); Smriti Rani, Kolkata (IN); Chirabrata Bhaumik, Kolkata (IN); Tapas Chakravarty, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 294 days.

(21) Appl. No.: 18/374,809

(22) Filed: Sep. 29, 2023

(65) Prior Publication Data
US 2024/0118413 A1    Apr. 11, 2024

(30) Foreign Application Priority Data
Oct. 4, 2022    (IN) .............................. 202221057044

(51) Int. Cl.
*G01S 13/90* (2006.01)
*G01S 7/41* (2006.01)

(52) U.S. Cl.
CPC .......... *G01S 13/9023* (2013.01); *G01S 7/417* (2013.01); *G01S 13/9011* (2013.01)

(58) Field of Classification Search
CPC .. G01S 13/9023; G01S 7/417; G01S 13/9011; G01S 13/9019; G01S 13/9054
See application file for complete search history.

(56) References Cited

U.S. PATENT DOCUMENTS 6,781,541 B1    8/2004    Cho
8,009,079 B2    8/2011    Connell et al.
(Continued)

FOREIGN PATENT DOCUMENTS

CN    111337924 A        6/2020
CN    113340191 A   *    9/2021    ............... G01B 7/16

OTHER PUBLICATIONS

Swain et. al. A. Swain, "MilliWear—A Short Range InSAR Approach for Surface Wear Inspection using mm-Wave Radar," 2022 IEEE Sensors, Dallas, TX, USA, 2022, pp. 1-4 (Year: 2022).*

*Primary Examiner* — Olumide Ajibade Akonai
*Assistant Examiner* — Bongani Jabulani Mashele
(74) *Attorney, Agent, or Firm* — Finnegan, Henderson, Farabow, Garrett & Dunner, LLP

(57) ABSTRACT

The present disclosure provides a method for surface wear inspection using millimeter wave radar. The system initially receives a plurality of uncompressed raw Synthetic Aperture Radar (SAR) images. Further, a plurality of reconstructed SAR images are generated based on the plurality of uncompressed raw SAR images using a variable focusing based Range Doppler Algorithm (RDA). Further, a master image and a slave image are selected from the reconstructed SAR images and corresponding anchor points are assigned. Further a plurality of fine level and coarse level shift coordinates are computed based on the corresponding anchor points. Further, a net shift value is computed based on the plurality of fine level and coarse level shift coordinates. The master and the slave images are aligned based on the net shift value and the interferogram is generated. The interferogram is further analyzed to profile the corresponding deformation pertaining to the surface under test.

12 Claims, 10 Drawing Sheets

(56) References Cited

U.S. PATENT DOCUMENTS

| | | |
|---|---|---|
| 8,244,485 B2 | 8/2012 | Buyukozturk et al. |
| 2021/0033726 A1 | 2/2021 | Jung et al. |

\* cited by examiner

METHOD AND SYSTEM FOR SURFACE WEAR INSPECTION USING MILLIMETER WAVE RADAR

PRIORITY CLAIM

This U.S. patent application claims priority under 35 U.S.C. § 119 to: Indian Patent Application No. 202221057044, filed on Oct. 4, 2022. The entire contents of the aforementioned application are incorporated herein by reference.

TECHNICAL FIELD

The disclosure herein generally relates to the field of interferometry and, more particularly, to a method and system for surface wear inspection using millimeter wave radar.

BACKGROUND

In tribological systems, surface wear is referred to as any change to the surface that involves progressive modification of the surface or loss/deposition of material. The surface wear results in plastic dislodging of surface/near-surface materials on micrometer to millimeter scale. The abrasive wear caused in milling and grinding process can wear out the protective lining of the mill equipment. Eventually, the mill must be stopped for repair and maintenance, causing undesirable downtime cost of the mill. A solution to this problem is predictive maintenance using online sensors that actively profile the surface deformation. The dust that is generated due to milling and grinding process cripples existing sensor modalities like laser surface profilers which cannot see through dust. This brings the millimeter (mm)-wave imaging systems like Synthetic Aperture Radar (SAR) into the picture, which can penetrate through occluded media while preserving the high resolution.

Conventional methods related to Interferometric Synthetic Aperture Radar (InSAR) are mostly centered around ground displacement measurements using space-borne, airborne, or Ground Based (GB)-InSAR. Even GB-InSAR used at medium range have per-pixel resolution in meters which is not sufficient for imaging wear and small surface defects. Since existing literature on surface profiling techniques indicates a gap in in-situ and unobtrusive measurement of wear with sub-millimeter accuracy during operation, especially using radars. there is a challenge in addressing in-situ surface wear examination based on high resolution short-range InSAR images.

SUMMARY

Embodiments of the present disclosure present technological improvements as solutions to one or more of the above-mentioned technical problems recognized by the inventors in conventional systems. For example, in one embodiment, a method for Surface wear inspection using millimeter wave radar is provided. The method includes receiving, a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass. Further, the method includes generating, by the one or more hardware processors, a plurality of reconstructed SAR images based on the plurality of uncompressed raw SAR images using a variable focusing based Range Doppler Algorithm (RDA). Finally, the method includes examining each of the plurality of reconstructed SAR images by iteratively performing: (i) selecting, by the one or more hardware processors, a master image from a first plurality of reconstructed SAR images and a slave image from a second plurality of reconstructed SAR images, from among the plurality of reconstructed SAR images (ii) assigning, by the one or more hardware processors, a plurality of anchor points for the master image and a plurality of anchor points for the slave image, using a signal processing technique, wherein the plurality of anchor points are generated using a spread function (iii) computing, by the one or more hardware processors, a plurality of coarse level shift coordinates based on a difference between the plurality of anchor points corresponding to the master image and the plurality of anchor points corresponding to the slave image (iv) generating, by the one or more hardware processors, a plurality of pixel groups for the master image and a plurality of pixel groups for the slave image by extracting a pixel group surrounding each of the plurality of anchor points corresponding to the master image and the slave image using a pixel extraction technique (v) generating, by the one or more hardware processors, a frequency domain representation of the plurality of pixel groups for the master image and a frequency domain representation of the plurality of pixel groups of the slave image by computing a 2D Fast Fourier Transform (FFT) on the corresponding plurality of pixel groups (vi) obtaining, by the one or more hardware processors, a plurality of over-sampled pixel groups for the master image and a plurality of over-sampled pixel groups for the slave image based on the corresponding frequency domain representation using zero padding (vii) generating, by the one or more hardware processors, a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image (viii) identifying, by the one or more hardware processors, a deformation information associated with each of the plurality of pixel groups for the master image and a deformation information associated with each of the plurality of pixel groups for the slave image based on the corresponding spatial domain representation using a spatial data analysis technique (ix) identifying, by the one or more hardware processors, a target pixel group for the master image and a target pixel group for the slave image based on the corresponding deformation information, wherein the pixel group having maximum deformation information is selected as the target pixel group (x) computing (324), by the one or more hardware processors, a plurality of fine level shift coordinates between the master image and the slave image based on a corresponding 2D cross-correlated target pixel groups using a sub-pixel level spatial shift computation technique (xi) estimating, by the one or more hardware processors, a net shift value based on the plurality of coarse level shift coordinates and the plurality of fine level shift coordinates using a statistical technique, wherein the master image and the slave image are aligned using the net shift value (xii) generating, by the one or more hardware processors, an interferogram based on the master image and a complex conjugate of the slave image using an interferogram generation technique and (xiii) profiling, by the one or more hardware processors, a deformdeformation pertaining to the surface under test based on color variations in the interferogram using an interferogram interpretation technique.

In another aspect, a system for Surface wear inspection using millimeter wave radar is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass. Further, the one or more hardware processors are configured by the programmed instructions to generate a plurality of reconstructed SAR images based on the plurality of uncompressed raw SAR images using a variable focusing based Range Doppler Algorithm (RDA). Finally, the one or more hardware processors are configured by the programmed instructions to examine each of the plurality of reconstructed SAR images by iteratively performing: (i) selecting, by the one or more hardware processors, a master image from a first plurality of reconstructed SAR images and a slave image from a second plurality of reconstructed SAR images, from among the plurality of reconstructed SAID images (ii) assigning, by the one or more hardware processors, a plurality of anchor points for the master image and a plurality of anchor points for the slave image, using a signal processing technique, wherein the plurality of anchor points are generated using a spread function (iii) computing, by the one or more hardware processors, a plurality of coarse level shift coordinates based on a difference between the plurality of anchor points corresponding to the master image and the plurality of anchor points corresponding to the slave image (iv) generating, by the one or more hardware processors, a plurality of pixel groups for the master image and a plurality of pixel groups for the slave image by extracting a pixel group surrounding each of the plurality of anchor points corresponding to the master image and the slave image using a pixel extraction technique (v) generating, by the one or more hardware processors, a frequency domain representation of the plurality of pixel groups for the master image and a frequency domain representation of the plurality of pixel groups of the slave image by computing a 2D Fast Fourier Transform (FFT) on the corresponding plurality of pixel groups (vi) obtaining, by the one or more hardware processors, a plurality of over-sampled pixel groups for the master image and a plurality of over-sampled pixel groups for the slave image based on the corresponding frequency domain representation using zero padding (vii) generating, by the one or more hardware processors, a spatial domain representation of the plurality of over-sampled pixel croups for the master image and a spatial domain representation of the plurality of over-sampled pixel groups for the slave image by computing an Inverse FFT (IFFT) on the plurality of over-sampled pixel groups corresponding to the master image and the slave image (viii) identifying, by the one or more hardware processors, a deformation information associated with each of the plurality of pixel groups for the master image and a deformation information associated with each of the plurality of pixel groups for the slave image based on the corresponding spatial domain representation using a spatial data analysis technique (ix) identifying, by the one or more hardware processors, a target pixel group for the master image and a target pixel group for the slave image based on the corresponding deformation information, wherein the pixel group having maximum deformation information is selected as the target pixel group (x) computing (324), by the one or more hardware processors, a plurality of fine level shift coordinates between the master image and the slave image based on a corresponding 2D cross-correlated target pixel groups using a sub-pixel level spatial shift computation technique (xi) estimating, by the one or more hardware processors, a net shift value based on the plurality of coarse level shift coordinates and the plurality of fine level shift coordinates using a statistical technique, wherein the master image and the slave image are aligned using the net shift value (xii) generating, by the one or more hardware processors, an interferogram based on the master image and a complex conjugate of the slave image using an interferogram generation technique and (xiii) profiling, by the one or more hardware processors, a deformation pertaining to the surface under test based on color variations in the interferogram using an interferogram interpretation technique.

In yet another aspect, a computer program product including a non-transitory computer-readable medium having embodied therein a computer program for Surface wear inspection using millimeter wave radar is provided. The computer readable program, when executed on a computing device, causes the computing device to receive a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass. Further, the computer readable program, when executed on a computing device, causes the computing device to generate a plurality of reconstructed SAR images based on the plurality of uncompressed raw SAR images using a variable focusing based Range Doppler Algorithm (RDA). Finally, the computer readable program, when executed on a computing device, causes the computing device to examine each of the plurality of reconstructed SAR images by iteratively performing: (i) selecting a master image from a first plurality of reconstructed SAR images and a slave image from a second plurality of reconstructed SAR images, from among the plurality of reconstructed SAR images (ii) assigning a plurality of anchor points for the master image and a plurality of anchor points for the slave image, using a signal processing technique, wherein the plurality of anchor points are generated using a spread function (iii) computing a plurality of coarse level shift coordinates based on a difference between the plurality of anchor points corresponding to the master image and the plurality of anchor points corresponding to the slave image (iv) generating a plurality of pixel groups for the master image and a plurality of pixel groups for the slave image by extracting a pixel group surrounding each of the plurality of anchor points corresponding to the master image and the slave image using a pixel extraction technique (v) generating a frequency domain representation of the plurality of pixel groups for the master image and a frequency domain representation of the plurality of pixel groups of the slave image by computing a 2D Fast Fourier Transform (FFT) on the corresponding plurality of pixel groups (vi) obtaining a plurality of over-sampled pixel groups for the master image and a plurality of over-sampled pixel groups for the slave image based on the corresponding frequency domain representation using zero padding (vii) generating a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image (viii) identifying a deformation information associated with each of the plurality of pixel groups for the master image and a deformation information associated with each of the plurality of pixel groups for the slave image based on the corresponding spatial domain representation using a spatial data analysis technique i(x) identifying a target pixel group for the master image and a target pixel group for the slave image based on the corresponding deformation information, wherein the pixel group having maximum deformation information is selected as the target pixel group (x) computing a plurality of fine level shift coordinates between the master image and the slave image based on a corresponding 2D cross-correlated target pixel groups using a sub-pixel level spatial shift computation technique (xi) estimating a net shift value based on the plurality of coarse level shift coordinates and the plurality of fine level shift coordinates using a statistical technique, wherein the master image and the slave image are aligned using the net shift value (xii) generating an interferogram based on the master image and a complex conjugate of the slave image using an interferogram generation technique and (xiii) profiling a deformation pertaining to the surface under test based on color variations in the interferogram using an interferogram interpretation technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
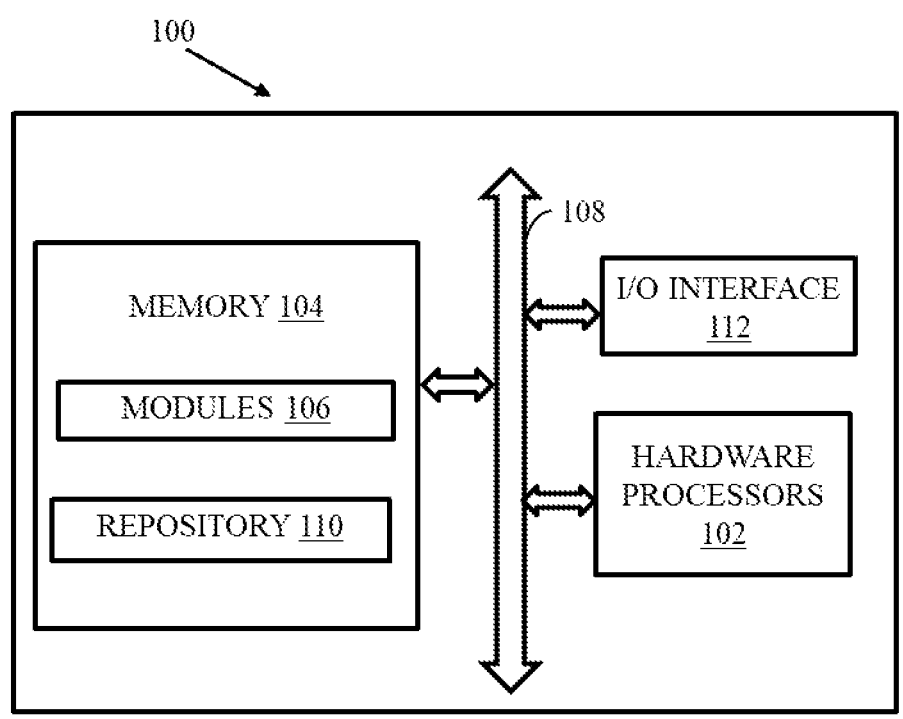
FIG. 1 is a functional block diagram of a system for surface wear inspection using millimeter wave radar, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

In-situ inspection of surface (for example, metallic surfaces) wear remains a daunting task for the industry. Detection of intermediate progressive dynamics of wear requires repeated examinations which is time-consuming, adding to mill downtime. Runtime inspection inside the mill necessitates the ability to sense through occluded media due to the presence of grinding dust. The present disclosure utilizes short range interferometric synthetic aperture radar (InSAR) to detect and quantify wear or other tribological phenomena associated with metallic surfaces. A novel variable focusing algorithm has been used to generate SAR images and a unique automated co-registration scheme has been employed in the InSAR processing pipeline. The reconstructed SAR images and the generated interferogram reflect strong overlap with the ground truth of the sample under test with minimum Mean Square Error (MSE).

The key contributions of the present disclosure are—1) Short range, repeat-pass InSAR technique for in-situ quantification of wear on metallic surfaces, 2) Automated, anchor point-based InSAR co-registration scheme for alignment of SAR images. 3) Novel variable focusing in range-doppler algorithm (RDA) to generate SAR images.

Embodiments herein provide a method and system for surface wear inspection using millimeter wave radar. The surface wear inspection is performed using a novel variable focusing algorithm to generate SAR images and a unique automated co-registration scheme to identify a deformation pertaining to a surface under test by generating interferograms. The system initially receives a plurality of uncompressed raw Synthetic Aperture Radar (SAR) images pertaining to a surface under test. The plurality of uncompressed raw SAR images includes a first plurality of raw SAR images captured sequentially from a plurality of vantage points in a single pass and a second plurality of raw SAR images captured sequentially from the plurality of vantage points in a repeat pass. Further, a plurality of reconstructed SAR images are generated based on the plurality of uncompressed raw SAR images using a variable focusing based Range Doppler Algorithm (RDA). Further, a master image and a slave image is selected from the reconstructed SAR images. Further, a plurality of anchor points are assigned for the master and the slave image. Further a plurality of fine level and coarse level shift coordinates are computed based on the plurality of anchor points. Further, a net shift value is computed based on the plurality of fine level and coarse level shift coordinates. The master and the slave images are aligned based on the net shift value and the interferogram is generated. The interferogram is further analyzed to profile the corresponding deformation pertaining to the surface under test.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of an surface wear inspection using millimeter wave radar, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
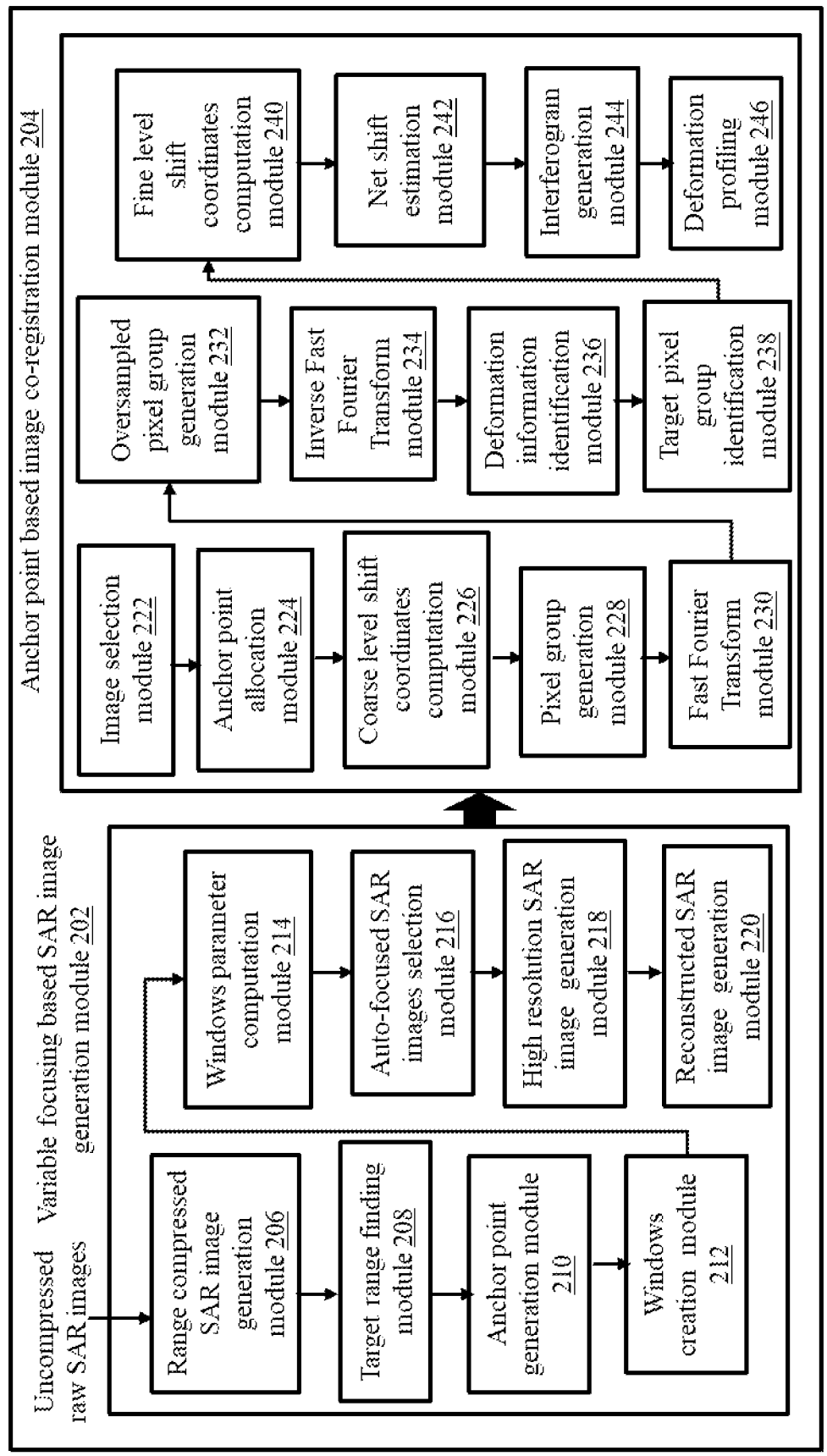
FIG. 2 illustrates a functional architecture of the system of FIG. 1, for surface wear inspection using millimeter wave radar, in accordance with some embodiments of the present disclosure.

The plurality of modules 106 include programs or coded instructions that supplement applications or functions performed by the system 100 for surface wear inspection using millimeter wave radar. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102 or by a combination thereof. The plurality of modules 106 can include various sub-modules (not shown). The plurality of modules 106 may include compute readable instructions that supplement applications or functions performed by the system 100 for the semantic navigation using spatial graph and trajectory history. In an embodiment, the modules 106 includes a variable focusing based SAR image generation module (shown in FIG. 2) and an anchor point based image co-registration module (shown in FIG. 2). The variable focusing based SAR image generation module includes a range compressed SAR image generation module (shown in FIG. 2), a target range finding module (shown in FIG. 2), an anchor point generation module (shown in FIG. 2), a windows creation module (shown in FIG. 2), a windows parameter computation module (shown in FIG. 2), an auto-focused SAR images selection module (shown in FIG. 2), a high resolution SAR image generation module (shown in FIG. 2), a reconstructed SAR image generation module (shown in FIG. 2). The anchor point based image co-registration module includes an image selection module (shown in FIG. 2), an anchor point allocation module (shown in FIG. 2), a coarse level shift coordinates computation module (shown in FIG. 2), a pixel group generation module (shown in FIG. 2), a Fast Fourier Transform (FFT) module (shown in FIG. 2), an oversampled pixel group generation module (shown in FIG. 2), an Inverse Fast Fourier Transform (IFFT) module (shown in FIG. 2), a deformation information identification module (shown in FIG. 2), a target pixel group identification module (shown in FIG. 2), a fine level shift coordinates computation module (shown in FIG. 2), a net shift estimation module (shown in FIG. 2), an interferogram generation module (shown in FIG. 2) and a deformation profiling module (shown in FIG. 2). In an embodiment, FIG. 2 illustrates a functional architecture of the system of FIG. 1, for surface wear inspection using millimeter wave radar, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 3A:
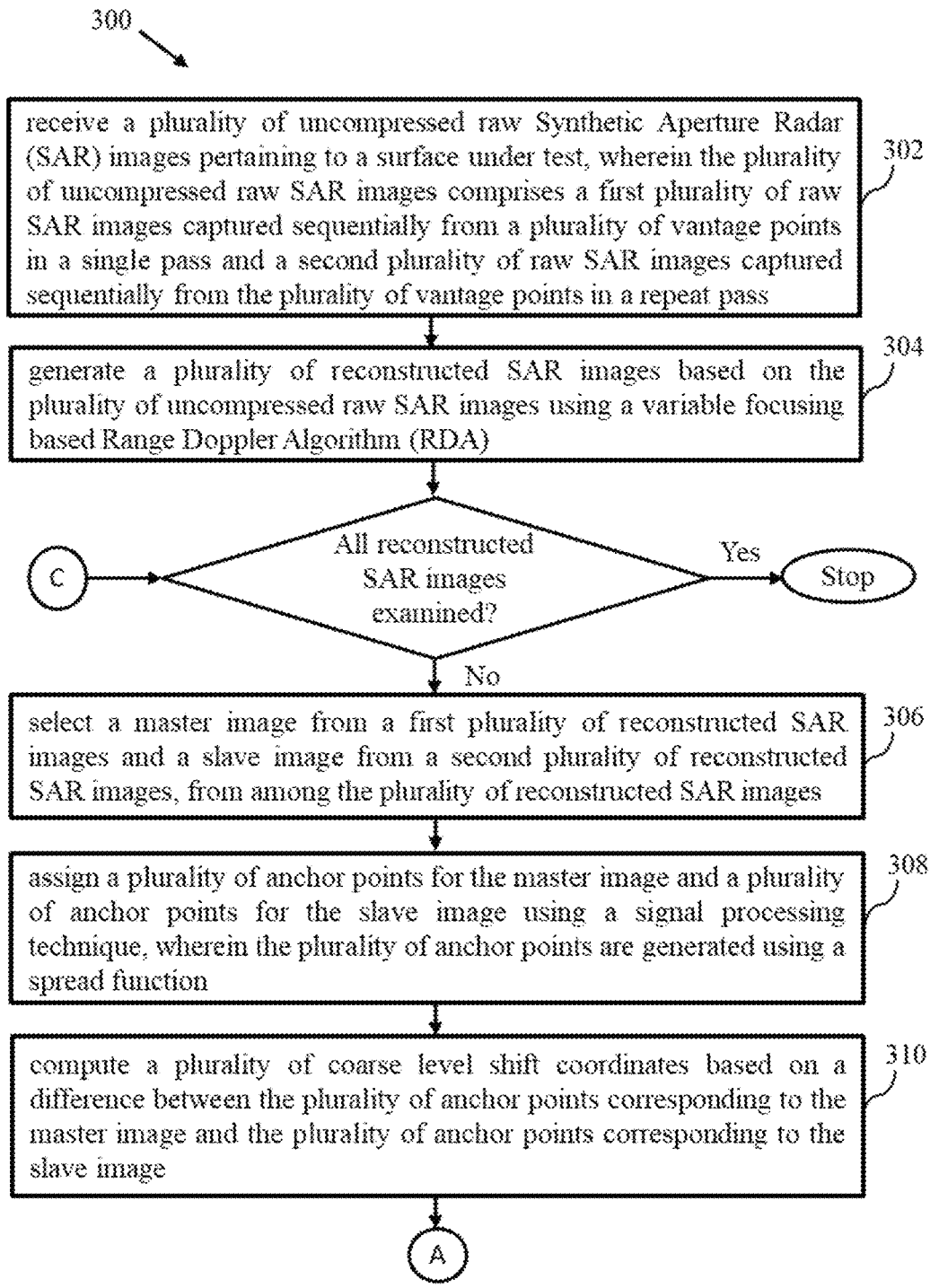
FIGS. 3A through 3C are an exemplary flow diagrams illustrating a processor implemented method 300 for surface wear inspection using millimeter wave radar, implemented by the system of FIG. 1 according to some embodiments of the present disclosure.
Figure 3B:
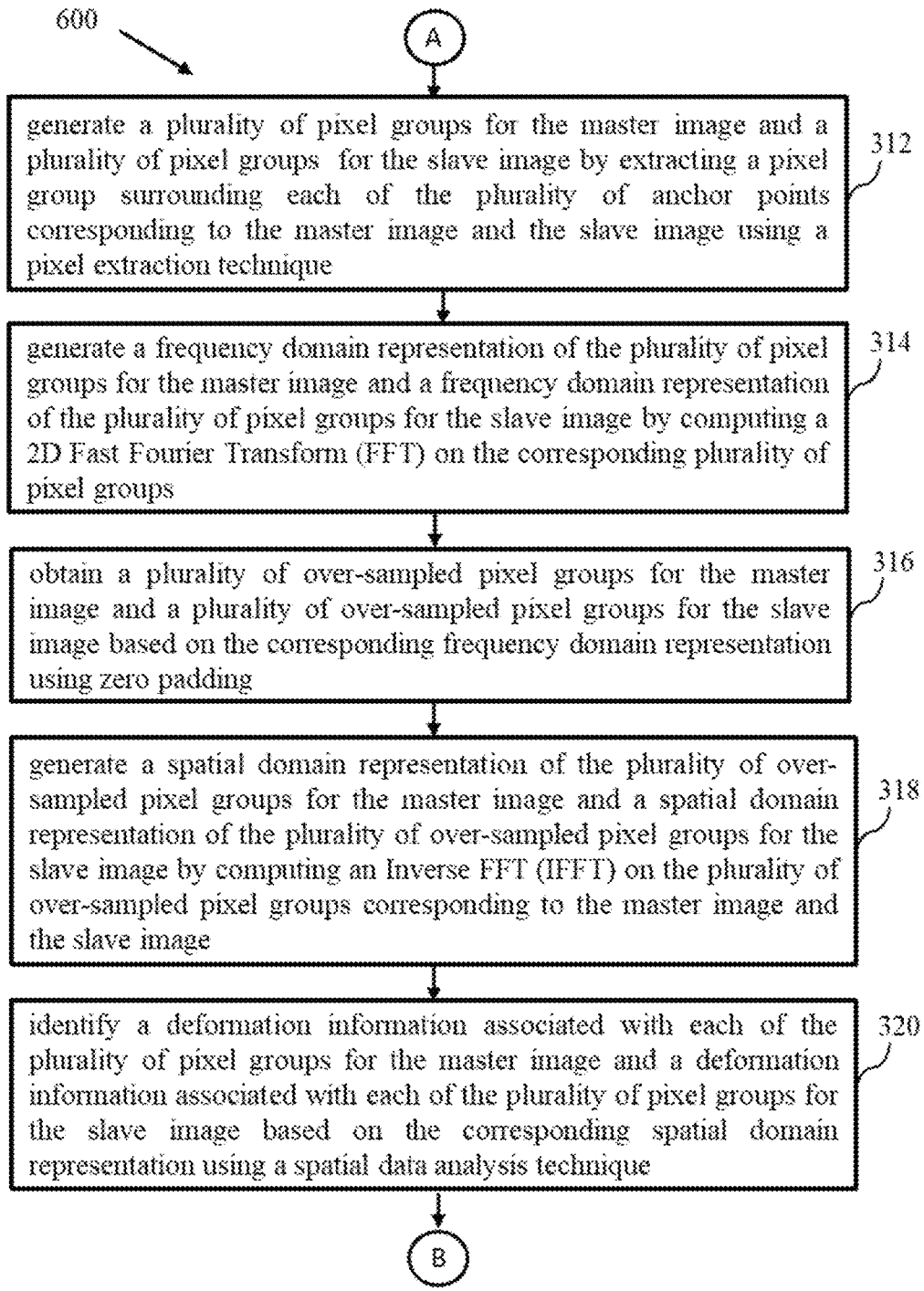
Figure 3C:
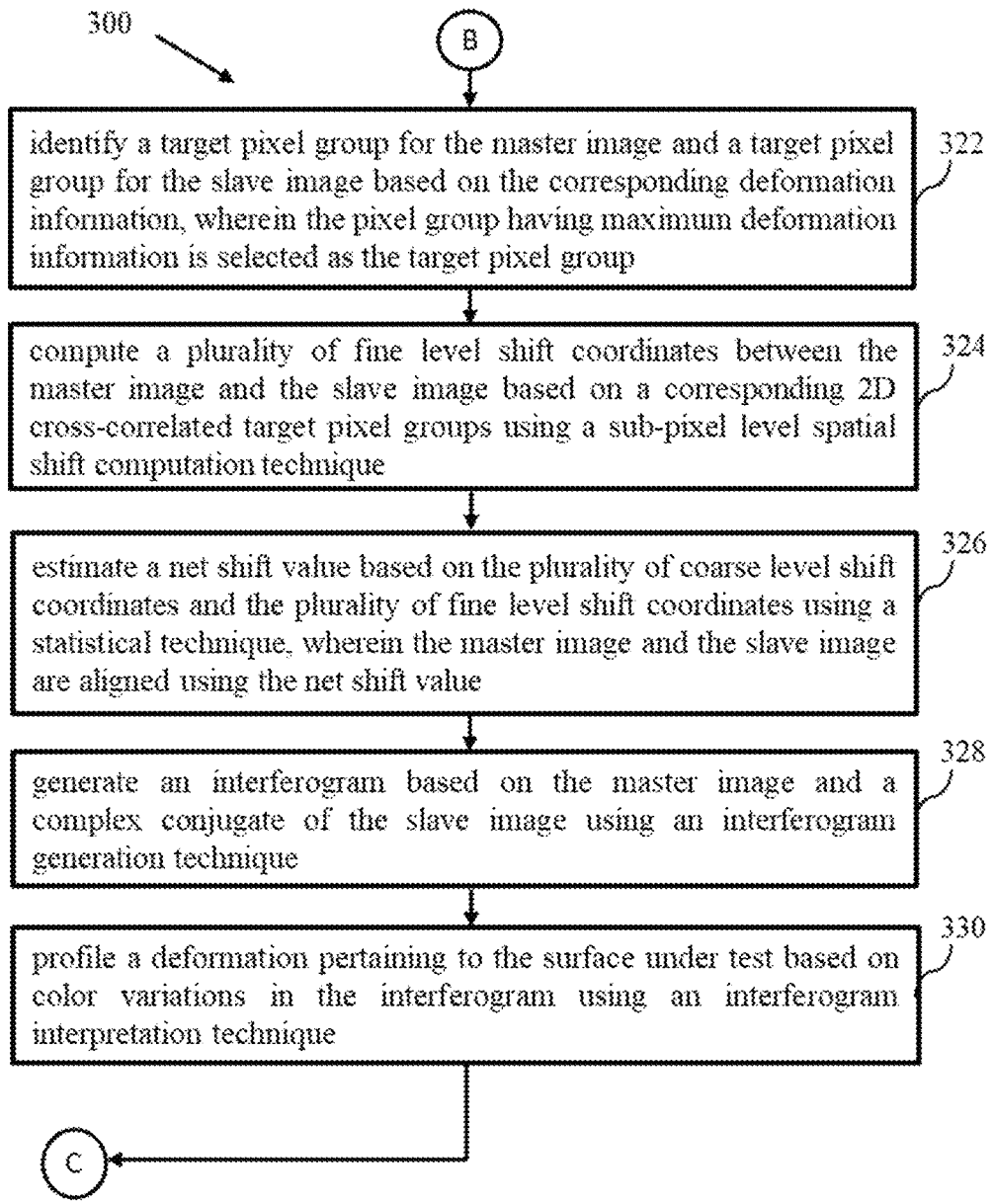

FIGS. 3A through 3C are exemplary flow diagrams illustrating a method 300 for surface wear inspection using millimeter wave radar implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102, The steps of the method 300 of the present disclosure will now be explained with reference to the components or blocks of the system 100 as depicted in FIG. 1 and the steps of flow diagram as depicted in FIGS. 3A through 3C. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive the plurality of uncompressed raw Synthetic Aperture Radar (SAR) images pertaining to a surface under test. The plurality of uncompressed raw SAR images comprises a first plurality of raw SAR images captured sequentially from a plurality of vantage points in a single pass and a second plurality of raw SAR images captured sequentially from the plurality of vantage points in a repeat pass. The single pass captures the first plurality of uncompressed raw SAR images from the plurality of vantage points at a time, and the repeat pass captures the second plurality of uncompressed raw SAR images from the plurality of vantage points at a varying time.

In an embodiment, the imaging of the surface under test can be carried out by using a contact probe based scanning mechanism or utilizing a moving platform to scan from a standoff distance using synthetic aperture radar (SAR). The SAR is a type of active data collection where a sensor produces its own energy and then records the amount of that energy reflected back after interacting with the surface under test. The incident mm-waves interact with the surface and induce a surface current density. Presence of any kind of defect, like surface wear or cracks, perturbs this current density and scatters the wave. Additionally, if a coherent radar is used in a SAR setup, the SAR images can be used in an interferometric SAR (InSAR) fashion.

In an embodiment, a commercial-off-the-shelf (COTS) pulsed coherent radar (PCR) has been used to conduct InSAR in short range for inspecting wears on a metallic surface. The data corresponding to the normal and worn-out sample was collected from two vantage points and was processed to produce interferograms of the target scene.

Figure 4A:
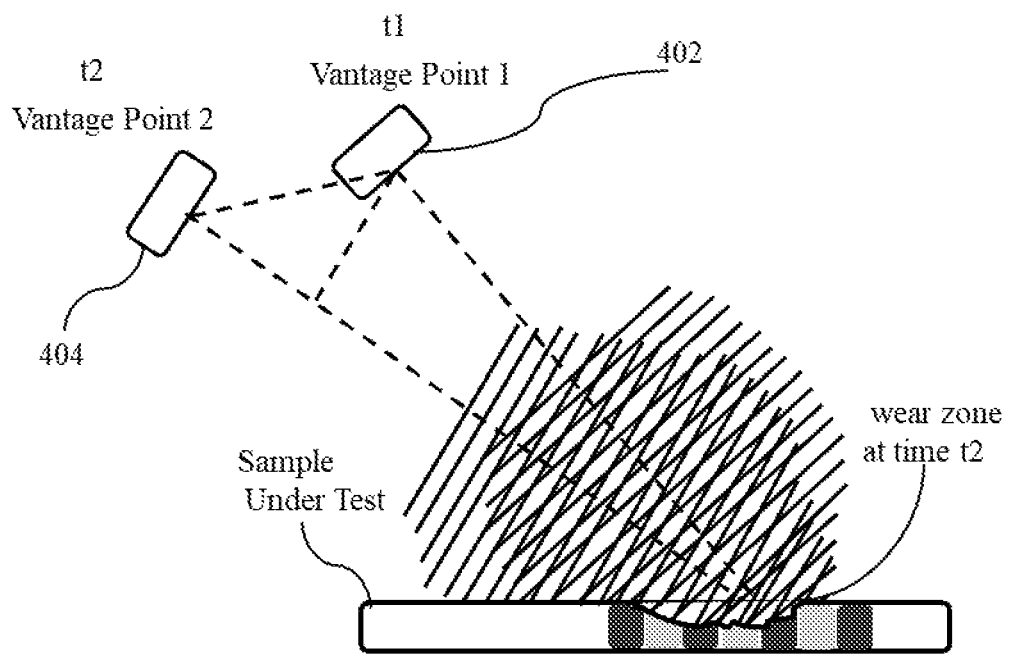
FIG. 4A illustrates a repeat pass SAR interferometry for profiling wear on a sample, implemented by the system of FIG. 1 according to some embodiments of the present disclosure.

FIG. 4A illustrates a repeat pass SAR interferometry for profiling wear on a sample, implemented by the system of FIG. 1 according to some embodiments of the present disclosure. Now referring to FIG. 4, a SAR 402 is located at vantage point 1 and another SAR 404 is located at vantage point 2. A vantage point is a position affording a good view of the surface under test 406. Now referring to FIG. 4A, the surface under test is a metallic surface which is normal at tome $t_1$ and undergone wear at time $t_2$. Now referring to equations (1) through (5), $I_k$ is the $k^{th}$ pass master image, $R_k$ is the corresponding slant range, $\theta_{s_k}$ is the stochastic phase contribution due to scattering, $\phi_k$ is the phase for the $k^{th}$ pass, $\Delta R$ is the path difference between successive passes and $\phi_{ifg}$ is the interferometric phase.

$$I_k = |I_k| e^{i\left[\frac{4\pi R_k}{\lambda} + \theta_{s_k}\right]} \tag{1}$$

$$\phi_k = \angle I_k = 2\frac{2\pi}{\lambda} R_k + \theta_{s_k} \tag{2}$$

$$R_k = R_{k-1} + \Delta R \tag{3}$$

$$I_{ifg} = I_{k-1} \cdot I_k^* \tag{4}$$

$$\phi_{ifg} = \frac{4\pi}{\lambda} \Delta R \tag{5}$$

At step 304 of the method 300, the variable focusing based SAR image generation module 202 executed by one or more hardware processors 102 is configured by the programmed instructions to generate the plurality of reconstructed SAR images based on the plurality of uncompressed raw SAR images using the variable focusing based RDA.

Figure 4B:
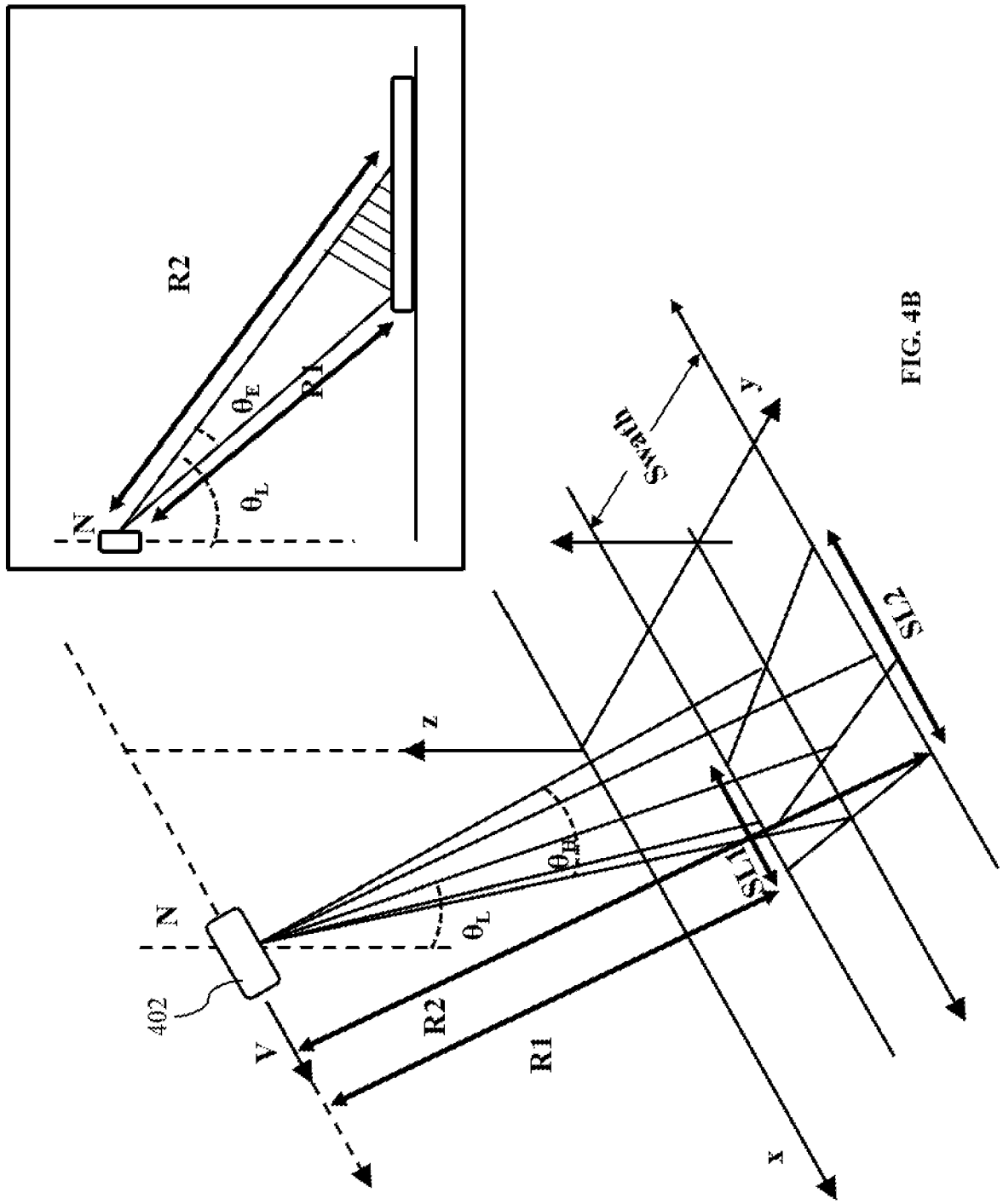
FIG. 4B illustrates an imaging geometry for a side looking Synthetic Aperture Radar (SAR) setup for surface wear inspection using millimeter wave radar, implemented by the system of FIG. 1 according to some embodiments of the present disclosure.

FIG. 4B illustrates an imaging geometry for a side looking Synthetic Aperture Radar (SAR) setup for surface wear inspection using millimeter wave radar, implemented by the system of FIG. 1 according to some embodiments of the present disclosure. FIG. 4B depicts a radar traversing along a flight path with a constant velocity V, and illuminating the sample of interest. The along-track and cross-track view of the same has been provided with labelled parameters like look angle θL, beamwidth along E-Plane θE and H-Plane θH, n ear-slant range R1 and far-slant range R2. In an embodiment, every point on an illuminated scene of a side looking, SAR can be uniquely mapped to its time delay (fast-time) and Doppler shift as shown in FIG. 4B.

There are three key steps in RDA algorithm for SAR image formation including a range compression, range migration correction and azimuth compression. In range migration, the reference function consists of two terms namely range walk or Doppler centroid ($f_{dc}$) and range curvature or Doppler frequency rate ($f_r$) as depicted in Equation (6) and (7). Here, R(t) is the kinematic expression for range, $R_0$ is the range around which correction is done, θ is the squint angle, λ is the wavelength, V stands for the platform's velocity and ϕ (t) is the time domain phase reference function. It must be noted that for low squint angle, θ tends to zero.

$$R(t) = R_0 - V\sin\theta t + \frac{V^2\cos^2\theta}{2R_0} \cdot t^2 \tag{6}$$

$$\phi(t) = e^{i\left(\frac{4\pi R_0}{\lambda}\right)} \cdot e^{i2\pi\left\{\left(\frac{-2V}{\lambda}\sin\theta t\right) - \frac{2V^2}{\lambda R_0}\cos^2\theta\left(\frac{t^2}{2}\right)\right\}} \tag{7}$$

Figure 5A:
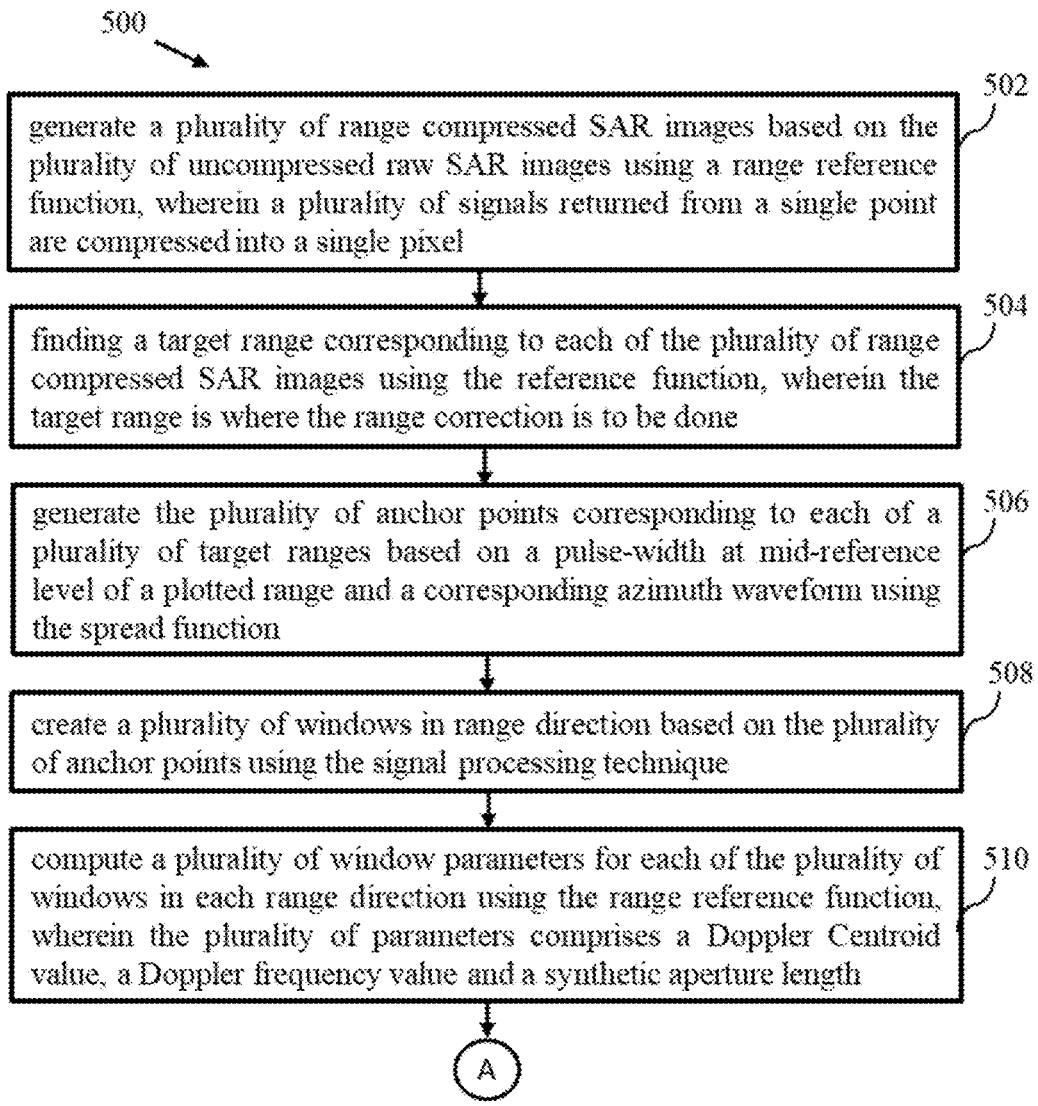
FIGS. 5A and 5B are exemplary flow diagrams illustrating a processor implemented method for generating the plurality of reconstructed SAR images, implemented by the system of FIG. 1 according to some embodiments of the present disclosure.
Figure 5B:
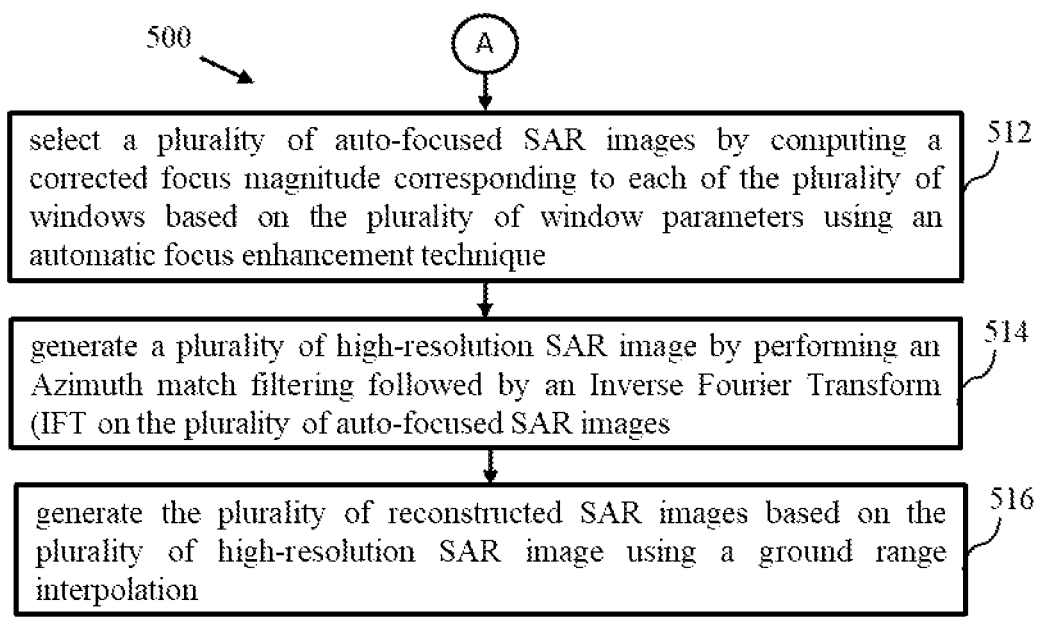
Figure 6:
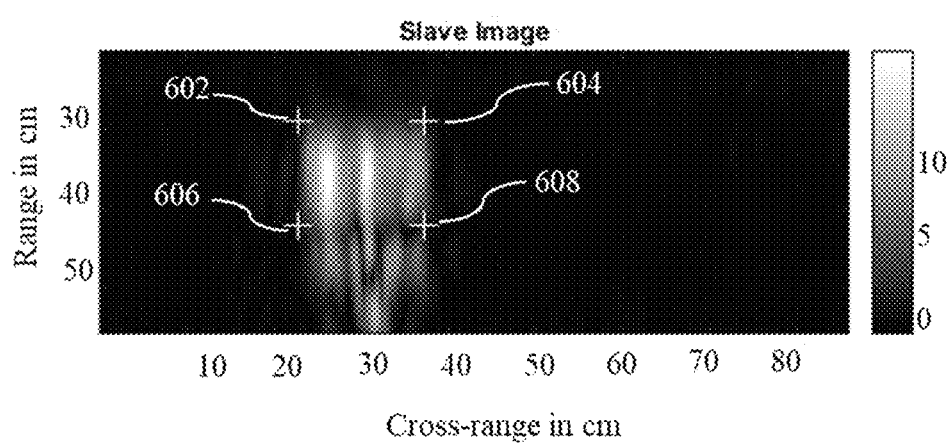
FIG. 6 illustrates example anchor points for the processor implemented method for generating the plurality of reconstructed SAR images, implemented by the system of FIG. 1 according to some embodiments of the present disclosure.

The method of generating the plurality of reconstructed SAR images is explained in conjunction with FIGS. 5A and 5B. Now referring to FIGS. 5A and 5B, at step 502 of the method 500, the range compressed SAR image generation module 206 executed by one or more hardware processors 102 is configured by the programmed instructions to generate the plurality of range compressed SAR images based on the plurality of uncompressed raw SAR images using a range reference function. The plurality of signals returned from a single point are compressed into a single pixel.

At step 504 of the method 500, the target range finding module 208 executed by one or more hardware processors 102 is configured by the programmed instructions to find a target range corresponding to each of the plurality of range compressed SAR images using the reference function, wherein the target range is where the range correction is to be done.

At step 506 of the method 500, the anchor point generation module 210 executed by one or more hardware processors 102 is configured by the programmed instructions to generate the plurality of anchor points corresponding to each of a plurality of target ranges based on a pulse-width at mid-reference level of a plotted range and a corresponding azimuth waveform using the spread function. The spread function represents a rectangular region in the space of observation where the object is situated. In an embodiment, the spread function is an array of four points comprising a near-range, a far-range, a near-azimuth and a far-azimuth as given in FIG. 6. Now referring to FIG. 6, cross-range is plotted in X-axis and the range is plotted in Y-axis. The points 602, 604, 606 and 608 are the anchor points associated with the spread function.

At step 508 of the method 500, the windows creation module 212 executed by one or more hardware processors 102 is configured by the programmed instructions to creating a plurality of windows in range direction based on the plurality of anchor points (shown in FIG. 6) using the signal processing technique.

At step 510 of the method 500, the windows parameter computation module 214 executed by one or more hardware processors 102 is configured by the programmed instructions to compute a plurality of window parameters for each of the plurality of windows in each range direction using the range reference function. The plurality of parameters comprises the Doppler Centroid value ($f_{dc}$), the Doppler frequency ($f_r$) value and a synthetic aperture length as shown in equations (6) and (7).

At step 512 of the method 500, the auto-focused SAR images selection module 216 executed by one or more hardware processors 102 is configured by the programmed instructions to select a plurality of auto-focused SAR images by computing a corrected focus magnitude corresponding to each of the plurality of windows based on the plurality of window parameters using an automatic focus enhancement technique. For example, the Doppler centroid and the Doppler frequency rate of each range window is used for automatic focus enhancement.

At step 514 of the method 500, the high resolution SAR image generation module 218 executed by one or more hardware processors 102 is configured by the programmed instructions to generate a plurality of high-resolution SAR image by performing an Azimuth match filtering followed by an IFT on the plurality of auto-focused SAR images. At step 516 of the method 500, the reconstructed SAR image generation module 220 executed by one or more hardware processors 102 is configured by the programmed instructions to generating the plurality of reconstructed SAR images based on the plurality of high-resolution SAR image using a ground range interpolation.

Referring to the method 300, the steps 306 to 330 are iteratively performed until each of the plurality of reconstructed SAR images is examined. At step 306 of the method 300, the image selection module 222 executed by the one or more hardware processors 102 is configured by the programmed instructions to select a master image from the first plurality of reconstructed SAR images and a slave image from the second plurality of reconstructed SAR images, from among the plurality of reconstructed SAR images.

At step 308 of the method 300, the anchor point allocation module 224 executed by the one or more hardware processors 102 is configured by the programmed instructions to assign the plurality of anchor points for the master image and the plurality of anchor points for the slave image using a signal processing technique, wherein the plurality of anchor points are generated using a spread function.

At step 310 of the method 300, the coarse level shift coordinates computation module 226 executed by the one or more hardware processors 102 is configured by the programmed instructions to compute a plurality of coarse level shift coordinates based on a difference between the plurality of anchor points corresponding to the master image and the plurality of anchor points corresponding to the slave image. For example, the coarse level shift coordinates are 8 cm (range) and 7.16 cm (azimuth)

At step 312 of the method 300, the pixel group generation module 228 executed by the one or more hardware processors 102 is configured by the programmed instructions to generate a plurality of pixel groups for the master image and a plurality of pixel groups for the slave image by extracting a pixel group surrounding each of the plurality of anchor points corresponding to the master image and the slave image using a pixel extraction technique. For example, a small pixel group of 28×28 pixels size is defined for slave image and similarly another small group of 32×32 pixels size is defined for master image. These group of pixels are selected around the corresponding anchor points.

At step 314 of the method 300, the Fast Fourier Transform (FFT) module 230 executed by the one or more hardware processors 102 is configured by the programmed instructions to generate a frequency domain representation of the plurality of pixel groups for the master image and a frequency domain representation of the plurality of pixel groups for the slave image by computing a 2D Fast Fourier Transform (FFT) on the corresponding plurality of pixel groups.

At step 316 of the method 300, the oversampled pixel group generation module 232 executed by the one or more hardware processors 102 is configured by the programmed instructions to obtain a plurality of over-sampled pixel groups for the master image and a plurality of over-sampled pixel groups for the slave image based on the corresponding frequency domain representation using zero padding. The zero padding is done in the frequency domain for oversampling. Apart from the existing number of sampling points, additional zero-valued points are taken for the over-sampling operation.

At step 318 of the method 300, the IFFT module 234 executed by the one or more hardware processors 102 is configured by the programmed instructions to generate a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image.

At step 320 of the method 300, the deformation information identification module 236 executed by the one or more hardware processors 102 is configured by the programmed instructions to identify a deformation information associated with each of the plurality of pixel groups for the master image and a deformation information associated with each of the plurality of pixel groups for the slave image based on the corresponding spatial domain representation using a spatial data analysis technique. For example, in the interferogram, the region with uniform phase represents a planar surface and the region with a interferometric-phase change represents surface deformation. In this way, wear zones are identified and exact deformation is calculated by subtracting the later from the uniform phase value.

At step 322 of the method 300, the target pixel group identification module 238 executed by the one or more hardware processors 102 is configured by the programmed instructions to identify a target pixel group for the master image and a target pixel croup for the slave image based on the corresponding deformation information. In an embodiment, the pixel group having maximum deformation information is selected as the target pixel group.

At step 324 of the method 300, the fine level shift coordinates computation module 240 executed by the one or more hardware processors 102 is configured by the programmed instructions to compute a plurality of fine level shift coordinates between the master image and the slave image based on a corresponding 2D cross-correlated target pixel groups using a sub-pixel level spatial shift computation technique. For example, the plurality of fine level shift coordinates are, 0.009 cm (range) and 0.003 cm (azimuth). The fine level shifting are in sub-mm level for accurate alignment. In an embodiment, the sub-pixel level spatial shift computation is achieved using oversampling techniques.

At step 326 of the method 300, the net shift estimation module 242 executed by the one or more hardware processors 102 is configured by the programmed instructions to estimate a net shift value based on the plurality of coarse level shift coordinates and the plurality of fine level shift coordinates using a statistical technique as shown in equations (8) and (9). The master image and the slave images are aligned based on the net shift value. Here the mean is taken over the number of anchor points.

$$\text{Net\_shift}\_x = \text{mean}(\text{fine\_shift}\_x) + \text{mean}(\text{coarse\_shift}\_x) \quad (8)$$

$$\text{Net\_shift}\_y = \text{mean}(\text{fine\_shift}\_y) + \text{mean}(\text{coarse\_shift}\_y) \quad (9)$$

At step 328 of the method 300, the interferogram generation module 244 executed by the one or more hardware processors 102 is configured by the programmed instructions to generate an interferogram based on the master image and a complex conjugate of the slave image using an interferogram generation technique. For example, the interferogram generation technique multiples the master image and the complex conjugate of the slave image thus subtracting the phase. At step 330 of the method 300, the deformation profiling module 246 executed by the one or more hardware processors 102 is configured by the programmed instructions to profile a deformation pertaining to the surface under test based on color variations in the interferogram using an interferogram interpretation technique. For example, in the interferogram, the region with uniform phase represents a planar surface. This will have a single colormap representation in the interferogram. In the zone having wear, the color would change.

Experimentation Details:

In an embodiment, the present disclosure is experimented as follows. The experimental setup is described as follows: The radar sensor was mounted on a conveyor belt and was made to perform stripmap scan linearly (at 3 cm/s speed). The 60 G Hz (with 7 GHz bandwidth, range resolution 0.5 mm) pulse coherent Acconeer XM112 low-power monostatic radar was used in the present disclosure. Unlike other COTS mm-wave radars which do not provide coherent phase measurement, this radar preserves the phase information. Additionally, it is provided with a hyperbolic di-electric lens which can narrow the wide beamwidth of the radar to a comparatively narrow and focused beam has 17° and 15° along the E-plane and H-plane respectively. The sample under test (SuT) consists of two aluminum alloy plates, among which one plate has been hammered to create worn out zones. The radar partially illuminates the sample to cover a 10 cm wide swath. The first pass of the radar was taken with a normal sample while during the repeat pass, the sample had already been replaced with a worn-out sample.

In an embodiment, the amplitude of the SAID images of the normal sample reconstructed using the present disclosure shows uniform backscatter throughout the stretch of the object. It is observed that the dimension in the range comes out to be 10 cm (i.e., theoretical swath width) calculation and the azimuth dimension matches to that of the real sample.

It is observed that, the phase difference has remained constant throughout the illuminated area except the part where the sample was hammered. The deformation of the marked points with respect to the reference point (non-deformed) is evaluated using equations (1) through (5) and summarized in Table I. Now referring to Table I, the table enlists various sampling points from the interferogram, the ground truth deformation taken using a laser rangefinder equipment, estimating the unwrapped phase difference and wear and finally, the squared error between the estimated wear and the ground truth deformation.

TABLE I

| Sl. No of the marking | Ground truth (mm) | Unwrapped (rad) | Measured wear (mm) | Squared error |
|---|---|---|---|---|
| 1 | 0.5 | 1.09 | 0.43 | 0.0289 |
| 2 | 1.5 | 2.45 | 1.22 | 0.0784 |
| 3 | 0.8 | 0.53 | 0.53 | 0.729 |
| 4 | 0 | 0.61 | 0.24 | 0.0576 |
| 5 | 0 | 0.66 | 0.26 | 0.0676 |
| MSE | | | | 0.0611 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of surface wear inspection using millimeter wave radar. The present disclosure conducts repeat-pass SAR interferometry in short range for non-contact surface profiling use-cases like in-situ surface wear inside mills, surface defect inspection through packaging or similar occluded environments. Further, the present disclosure implemented an unique variable aperture range-doppler algorithm to generate SAR images and an anchor point-based automated co-registration scheme to align these images for InSAR. The amplitude images of the worn-out sample provide an indication of the worn-out zone. Furthermore, the interferogram gives us a sub-mm precise measure of the deformation caused due to wear. The mean squared error of wear quantification is found to be 0.0611. In the next phase of our research, we plan we include more realistic surface wear-scenarios and will work on image processing of the obtained InSAR images.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms, and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
   receiving, by one or more hardware processors, a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass;
   generating, by the one or more hardware processors, a plurality of reconstructed SAR images based on the plurality of uncompressed raw SAR images using a variable focusing based Range Doppler Algorithm (RDA); and
   examining, by the one or more hardware processors, each of the plurality of reconstructed SAR images by iteratively performing:
      selecting a master image from a first plurality of reconstructed SAR images and a slave image from a second plurality of reconstructed SAR images, from among the plurality of reconstructed SAR images;
      assigning a plurality of anchor points for the master image and a plurality of anchor points for the slave image, using a signal processing technique, wherein the plurality of anchor points are generated using a spread function;
      computing a plurality of coarse level shift coordinates based on a difference between the plurality of anchor points corresponding to the master image and the plurality of anchor points corresponding to the slave image;
      generating a plurality of pixel groups for the master image and a plurality of pixel groups for the slave image by extracting a pixel group surrounding each of the plurality of anchor points corresponding to the master image and the slave image using a pixel extraction technique;
      generating a frequency domain representation of the plurality of pixel groups for the master image and a frequency domain representation of the plurality of pixel groups of the slave image by computing a 2D Fast Fourier Transform (FFT) on the corresponding plurality of pixel groups;
      obtaining a plurality of over-sampled pixel groups for the master image and a plurality of over-sampled pixel groups for the slave image based on the corresponding frequency domain representation using zero padding;
      generating a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image;
      identifying a deformation information associated with each of the plurality of pixel groups for the master image and a deformation information associated with each of the plurality of pixel groups for the slave image based on the corresponding spatial domain representation using a spatial data analysis technique;

identifying a target pixel group for the master image and a target pixel group for the slave image based on the corresponding deformation information, wherein the pixel group having maximum deformation information is selected as the target pixel group;

computing a plurality of fine level shift coordinates between the master image and the slave image based on a corresponding 2D cross-correlated target pixel groups using a sub-pixel level spatial shift computation technique;

estimating a net shift value based on the plurality of coarse level shift coordinates and the plurality of fine level shift coordinates using a statistical technique, wherein the master image and the slave image are aligned using the net shift value;

generating an interferogram based on the master image and a complex conjugate of the slave image using an interferogram generation technique; and profiling a deformation pertaining to the surface under test based on color variations in the interferogram using an interferogram interpretation technique.

2. The processor implemented method of claim 1, wherein the method of generating the plurality of reconstructed SAR images from the plurality of uncompressed raw SAR images using the variable focusing based RDA comprises:

generating a plurality of range compressed SAR images based on the plurality of uncompressed raw SAR images using a range reference function, wherein a plurality of signals returned from a single point are compressed into a single pixel;

finding a target range corresponding to each of the plurality of range compressed SAR images using the reference function, wherein the target range represents a range where the range correction is required;

generating the plurality of anchor points corresponding to each of a plurality of target ranges based on a pulse-width at mid-reference level of a plotted range and a corresponding azimuth waveform using the spread function;

creating a plurality of windows in range direction based on the plurality of anchor points using the signal processing technique;

computing a plurality of window parameters for each of the plurality of windows in each range direction using the range reference function, wherein the plurality of parameters comprises a Doppler Centroid value, a Doppler frequency value and a synthetic aperture length, selecting a plurality of auto-focused SAR images by computing a corrected focus magnitude corresponding to each of the plurality of windows based on the plurality of window parameters using an automatic focus enhancement technique;

generating a plurality of high-resolution SAR images by performing an Azimuth match filtering followed by an Inverse Fourier Transform on the plurality of auto-focused SAR images; and generating the plurality of reconstructed SAR images based on the plurality of high-resolution SAR image using a ground range interpolation.

3. The processor implemented method of claim 2, wherein the plurality of anchor points comprises a near-range, a far-range, a near-azimuth, and a far-azimuth.

4. The processor implemented method of claim 1, wherein the single pass captures the first plurality of uncompressed raw SAR images from the plurality of vantage points at a time, and the repeat pass captures the second plurality of uncompressed raw SAR images from the plurality of vantage points at a varying time.

5. A system comprising:

at least one memory storing programmed instructions; one or more Input/Output (I/O) interfaces; and one or more hardware processors operatively coupled to the at least one memory, wherein the one or more hardware processors are configured by the programmed instructions to;

receive a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass;

generate a plurality of reconstructed SAR images based on the plurality of uncompressed raw SAR images using a variable focusing based Range Doppler Algorithm (RDA); and examine each of the plurality of reconstructed SAR images by iteratively performing:

selecting a master image from a first plurality of reconstructed SAR images and a slave image from a second plurality of reconstructed SAR images, from among the plurality of reconstructed SAR images;

assigning a plurality of anchor points for the master image and a plurality of anchor points for the slave image, using a signal processing technique, wherein the plurality of anchor points are generated using a spread function;

computing a plurality of coarse level shift coordinates based on a difference between the plurality of anchor points corresponding to the master image and the plurality of anchor points corresponding to the slave image;

generating a plurality of pixel groups for the master image and a plurality of pixel groups for the slave image by extracting a pixel group surrounding each of the plurality of anchor points corresponding to the master image and the slave image using a pixel extraction technique;

generating a frequency domain representation of the plurality of pixel groups for the master image and a frequency domain representation of the plurality of pixel groups of the slave image by computing a 2D Fast Fourier Transform (FFT) on the corresponding plurality of pixel groups;

obtaining a plurality of over-sampled pixel groups for the master image and a plurality of over-sampled pixel groups for the slave image based on the corresponding frequency domain representation using zero padding;

generating a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image;

identifying a deformation information associated with each of the plurality of pixel groups for the master image and a deformation information associated with each of the plurality of pixel groups for the slave image based on the corresponding spatial domain representation using a spatial data analysis technique;

identifying a target pixel group for the master image and a target pixel group for the slave image based on the corresponding deformation information, wherein the pixel group having maximum deformation information is selected as the target pixel group;

computing a plurality of fine level shift coordinates between the master image and the slave image based on a corresponding 2D cross-correlated target pixel groups using a sub-pixel level spatial shift computation technique;

estimating a net shift value based on the plurality of coarse level shift coordinates and the plurality of fine level shift coordinates using a statistical technique, wherein the master image and the slave image are aligned using the net shift value;

generating an interferogram based on the master image and a complex conjugate of the slave image using an interferogram generation technique; and profiling a deformation pertaining to the surface under test based on color variations in the interferogram using an interferogram interpretation technique.

6. The system of claim 5, wherein the one or more hardware processors are configured by the plurality of instructions to generate the plurality of reconstructed SAR images from the plurality of uncompressed raw SAR images using the variable focusing based RDA, by:

generating a plurality of range compressed SAR images based on the plurality of uncompressed raw SAR images using a range reference function, wherein a plurality of signals returned from a single point are compressed into a single pixel;

finding a target range corresponding to each of the plurality of range compressed SAR images using the reference function, wherein the target range represents a range where the range correction is required;

generating the plurality of anchor points corresponding to each of a plurality of target ranges based on a pulse-width at mid-reference level of a plotted range and a corresponding azimuth waveform using the spread function;

creating a plurality of windows in range direction based on the plurality of anchor points using the signal processing technique;

computing a plurality of window parameters for each of the plurality of windows in each range direction using the range reference function, wherein the plurality of parameters comprises a Doppler Centroid value, a Doppler frequency value and a synthetic aperture length;

selecting a plurality of auto-focused SAR images by computing a corrected focus magnitude corresponding to each of the plurality of windows based on the plurality of window parameters using an automatic focus enhancement technique;

generating a plurality of high-resolution SAR images by performing an Azimuth match filtering followed by an Inverse Fourier Transform on the plurality of auto-focused SAR images; and generating the plurality of reconstructed SAR images based on the plurality of high-resolution SAR image using a around range interpolation.

7. The system of claim 6, wherein the plurality of anchor points comprises a near-range, a far-range, a near-azimuth, and a far-azimuth.

8. The system of claim 5, wherein the single pass captures the first plurality of uncompressed raw SAR images from the plurality of vantage points at a time, and the repeat pass captures the second plurality of uncompressed raw SAR images from the plurality of vantage points at a varying time.

9. One or more non-transitory machine-readable information storage mediums comprising one or more instructions which when executed by one or more hardware processors cause:

receiving, a plurality of uncompressed raw Synthetic Aperture Radar (SAR) images pertaining to a surface under test, wherein the plurality of uncompressed raw SAR images comprises a first plurality of raw SAR images captured sequentially from a plurality of vantage points in a single pass and a second plurality of raw SAR images captured sequentially from the plurality of vantage points in a repeat pass;

generating a plurality of reconstructed SAR images based on the plurality of uncompressed raw SAR images using a variable focusing based Range Doppler Algorithm (RDA); and examining each of the plurality of reconstructed SAR images by iteratively performing:

selecting a master image from a first plurality of reconstructed SAR images and a slave image from a second plurality of reconstructed SAR images, from among the plurality of reconstructed SAR images;

assigning a plurality of anchor points for the master image and a plurality of anchor points for the slave image, using a signal processing technique, wherein the plurality of anchor points are generated using a spread function;

computing a plurality of coarse level shift coordinates based on a difference between the plurality of anchor points corresponding to the master image and the plurality of anchor points corresponding to the slave image;

generating a plurality of pixel groups for the master image and a plurality of pixel groups for the slave image by extracting a pixel group surrounding each of the plurality of anchor points corresponding to the master image and the slave image using a pixel extraction technique;

generating a frequency domain representation of the plurality of pixel groups for the master image and a frequency domain representation of the plurality of pixel groups of the slave image by computing a 2D Fast Fourier Transform (FFT) on the corresponding plurality of pixel groups;

obtaining a plurality of over-sampled pixel groups for the master image and a plurality of over-sampled pixel groups for the slave image based on the corresponding frequency domain representation using zero padding;

generating a spatial domain representation of the plurality of over-sampled pixel groups for the master image and a spatial domain representation of the plurality of over-sampled pixel groups for the slave image by computing an Inverse FFT (IFFT) on the plurality of over-sampled pixel groups corresponding to the master image and the slave image;

identifying a deformation information associated with each of the plurality of pixel groups for the master image and a deformation information associated with each of the plurality of pixel groups for the slave image based on the corresponding spatial domain representation using a spatial data analysis technique;

identifying a target pixel group for the master image and a target pixel group for the slave image based on the corresponding deformation information, wherein the pixel group having maximum deformation information is selected as the target pixel group;

computing a plurality of fine level shift coordinates between the master image and the slave image based on a corresponding 2D cross-correlated target pixel groups using a sub-pixel level spatial shift computation technique;

estimating a net shift value based on the plurality of coarse level shift coordinates and the plurality of fine level shift coordinates using a statistical technique, wherein the master image and the slave image are aligned using the net shift value;

generating an interferogram based on the master image and a complex conjugate of the slave image using an interferogram generation technique; and profiling a deformation pertaining to the surface under test based on color variations in the interferogram using an interferogram interpretation technique.

10. The one or more non-transitory machine-readable information storage mediums of claim 9, wherein the method of generating the plurality of reconstructed SAR images from the plurality of uncompressed raw SAR images using the variable focusing based RDA comprises:

generating a plurality of range compressed SAR images based on the plurality of uncompressed raw SAR images using a range reference function, wherein a plurality of signals returned from a single point are compressed into a single pixel;

finding a target range corresponding to each of the plurality of range compressed SAR images using the reference function, wherein the target range represents a range where the range correction is required;

generating the plurality of anchor points corresponding to each of a plurality of target ranges based on a pure-width at mid-reference level of a plotted range and a corresponding azimuth waveform using the spread function;

creating a plurality of windows in range direction based on the plurality of anchor points using the signal processing technique;

computing a plurality of window parameters for each of the plurality of windows in each range direction using the range reference function, wherein the plurality of parameters comprises a Doppler Centroid value, a Doppler frequency value and a synthetic aperture length;

selecting a plurality of auto-focused SAR images by computing a corrected focus magnitude corresponding to each of the plurality of windows based on the plurality of window parameters using an automatic focus enhancement technique;

generating a plurality of high-resolution SAR images by performing an Azimuth match filtering followed by an Inverse Fourier Transform on the plurality of auto-focused SAR images; and generating the plurality of reconstructed SAR images based on the plurality of high-resolution SAR image using a ground range interpolation.

11. The one or more non-transitory machine-readable information storage mediums of claim 10, wherein the plurality of anchor points comprises a near-range, a far-range, a near-azimuth, and a far-azimuth.

12. The one or more non-transitory machine-readable information storage mediums of claim 9, wherein the single pass captures the first plurality of uncompressed raw SAR images from the plurality of vantage points at a time, and the repeat pass captures the second plurality of uncompressed raw SAR images from the plurality of vantage points at a varying time.

* * * * *